(12) United States Patent
Takao et al.

(10) Patent No.: US 8,124,215 B2
(45) Date of Patent: *Feb. 28, 2012

(54) HARD-COATED ANTIGLARE FILM, METHOD OF MANUFACTURING THE SAME, OPTICAL DEVICE, POLARIZING PLATE, AND IMAGE DISPLAY

(75) Inventors: Hiroyuki Takao, Ibaraki (JP); Daisuke Hamamoto, Ibaraki (JP); Katsunori Takada, Ibaraki (JP); Seiichi Kusumoto, Ibaraki (JP); Yuuichi Kimura, Ibaraki (JP); Takayuki Shigematsu, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 629 days.

This patent is subject to a terminal disclaimer.

(21) Appl. No.: 11/727,393

(22) Filed: Mar. 26, 2007

(65) Prior Publication Data
US 2007/0242362 A1 Oct. 18, 2007

(30) Foreign Application Priority Data

Mar. 28, 2006 (JP) ................................. 2006-087662
Sep. 4, 2006 (JP) ................................. 2006-239138

(51) Int. Cl.
*B32B 27/00* (2006.01)
*B05D 7/00* (2006.01)

(52) U.S. Cl. ...... 428/143; 428/1.5; 428/423.1; 359/601; 427/407.1

(58) Field of Classification Search ................... 428/143
See application file for complete search history.

(56) References Cited

U.S. PATENT DOCUMENTS

| | | | | |
|---|---|---|---|---|
| 4,972,117 A | * | 11/1990 | Adler et al. | 313/478 |
| 5,909,314 A | * | 6/1999 | Oka et al. | 359/582 |
| 5,998,013 A | * | 12/1999 | Shoshi et al. | 428/331 |
| 6,777,070 B1 | * | 8/2004 | Murata et al. | 428/323 |
| 7,371,439 B2 | * | 5/2008 | Matsunaga et al. | 428/331 |
| 7,390,099 B2 | * | 6/2008 | Takao et al. | 359/601 |

(Continued)

FOREIGN PATENT DOCUMENTS

EP 1069088 A1 * 1/2001
(Continued)

OTHER PUBLICATIONS

Taiwanese Office Action dated Feb. 18, 2011 issued in corresponding Taiwanese Patent Application No. 096110873.

*Primary Examiner* — David Sample
*Assistant Examiner* — Laura Auer
(74) *Attorney, Agent, or Firm* — Westerman, Hattori, Daniels & Adrian, LLP (57) ABSTRACT

A hard-coated antiglare film is provided that has high hardness, high scratch resistance, and good antiglare properties. In the hard-coated antiglare film of the present invention including a transparent plastic film substrate, a hard-coating layer containing fine particles is formed on at least one surface of the transparent plastic film substrate, the hard-coating layer has a thickness in the range of 15 to 30 μm, the fine particles have a weight average particle size of 30 to 75% of a thickness of the hard-coating layer, the average tilt angle θa of the unevenness of the hard-coating layer surface is in the range of 0.4° to 1.5°, and the hard-coating layer is formed using a resin for forming the hard-coating layer containing three specific resin components.

14 Claims, 2 Drawing Sheets

U.S. PATENT DOCUMENTS

| | | |
|---|---|---|
| 7,604,358 B2 * | 10/2009 | Ninomiya et al. ............. 359/601 |
| 7,901,746 B2 * | 3/2011 | Noguchi et al. ................ 428/1.5 |
| 7,963,660 B2 * | 6/2011 | Hamamoto et al. ........... 359/601 |
| 2001/0050741 A1 | 12/2001 | Hokazono et al. |
| 2002/0142133 A1 * | 10/2002 | Matsunaga et al. ............ 428/141 |
| 2003/0123151 A1 | 7/2003 | Matsunaga et al. |
| 2005/0063066 A1 | 3/2005 | Namioka et al. |
| 2005/0064142 A1 | 3/2005 | Matsunaga et al. |
| 2005/0096431 A1 | 5/2005 | Fujii et al. |
| 2005/0255291 A1 | 11/2005 | Iwata et al. |
| 2006/0052565 A1 | 3/2006 | Yoshioka et al. |
| 2007/0042173 A1 * | 2/2007 | Nagaoka et al. ............ 428/313.9 |
| 2008/0057262 A1 | 3/2008 | Ooishi et al. |
| 2008/0130123 A1 | 6/2008 | Namioka et al. |

FOREIGN PATENT DOCUMENTS

| | | | |
|---|---|---|---|
| EP | 1160591 A1 | | 12/2001 |
| JP | 11-286083 A | | 10/1999 |
| JP | 2000-233611 A | | 8/2000 |
| JP | 2000-326447 A | | 11/2000 |
| JP | 2000326447 A | * | 11/2000 |
| JP | 2001-194504 A | | 7/2001 |
| JP | 2001-264508 A | | 9/2001 |
| JP | 2001-343529 A | | 12/2001 |
| JP | 2003-4903 A | | 1/2003 |
| JP | 2004-167827 A | | 6/2004 |
| JP | 2005-122147 A | | 5/2005 |
| JP | 2005-186576 A | | 7/2005 |
| JP | 2005-227407 A | | 8/2005 |
| JP | 2005-284142 A | | 10/2005 |
| JP | 2006-30837 A | | 2/2006 |
| JP | 2006078538 A | * | 3/2006 |
| KR | 10-1996-0010731 A | | 4/1996 |
| KR | 10-2000-0021809 A | | 4/2000 |
| KR | 10-2006-0069326 A | | 6/2006 |
| KR | 10-2006-0072072 A | | 6/2006 |
| KR | 2006-0072072 A | | 6/2006 |
| TW | 520445 | | 2/2003 |
| TW | 200300499 A | | 6/2003 |
| TW | 200302923 A | | 8/2003 |
| TW | 200510779 A | | 3/2005 |
| TW | 200604561 A | | 2/2006 |
| WO | WO 95/31737 A1 | | 11/1995 |
| WO | 03/060573 A2 | | 7/2003 |
| WO | WO 2005/098480 A1 | | 10/2005 |

* cited by examiner

HARD-COATED ANTIGLARE FILM, METHOD OF MANUFACTURING THE SAME, OPTICAL DEVICE, POLARIZING PLATE, AND IMAGE DISPLAY

FIELD OF THE INVENTION

The present invention relates generally to a hard-coated antiglare film, a method of manufacturing the same, an optical device, a polarizing plate, and an image display.

BACKGROUND OF THE INVENTION

With technical improvement in recent years, liquid crystal displays (LCDs), plasma display panels (PDPs), electroluminescence displays (ELDs), etc. have been developed in addition to conventional cathode ray tubes (CRTs) as image displays and have been used practically. As LCDs have been technically improved to provide wide viewing angles, high resolution, high response, good color reproduction, and the like, applications of LCDs are spreading from laptop personal computers and monitors to television sets. In a basic LCD structure, a pair of flat glass substrates each provided with a transparent electrode are opposed via a spacer to form a constant gap, between which a liquid crystal material is placed and sealed to form a liquid crystal cell, and a polarizing plate is formed on the outside surface of each of the pair of glass substrates. In a conventional technique, a glass or plastic cover plate is attached to the surface of the liquid crystal cell in order to prevent scratches on the polarizing plate bonded to the surface of the liquid crystal cell. However, the placement of such a cover plate is disadvantageous in terms of cost and weight. Thus, a hard coating process has gradually been used to treat the surface of polarizing plates. It is common in the hard-coating process that a hard-coated antiglare film is used so as to serve also to prevent, for example, reflection of a light source onto LCDs.

A hard-coated antiglare film is used in which a thin hard-coating layer with a thickness of 2 to 10 μm has been formed on one or both surface of a transparent plastic film substrate. The hard-coating layer is formed using resins for forming a hard-coating layer such as thermosetting resins or ultraviolet (UV)-curable resins and fine particles. The surface of the hard-coating layer is provided with unevenness by the fine particles so as to provide antiglare properties. If such resins are applied to a glass plate to form the hard-coating layer, it can exhibit a pencil hardness of 4 H or more. If a hard-coating layer with an insufficient thickness is formed on a transparent plastic film substrate, however, the pencil hardness of the layer can be generally affected by the substrate and reduced to 3 H or less.

LCD applications have come to include home television sets, and thus it is easily expected that the users of general home television sets should handle LCD television sets in the same manner as in the case of conventional glass CRT television sets. Glass CRTs have a pencil hardness of about 9 H. Thus, hard-coated antiglare films to be used for LCDs have been required to have higher hardness.

An increase in the hardness of hard-coated antiglare films is possible by increasing the thickness of their hard-coating layer. However, the increase in layer thickness can cause a problem in that the particles are completely buried in the hard-coating layer and cannot provide sufficient antiglare properties. The addition amount of the fine particles may be increased to improve the antiglare properties, but in such a method, the number of the particles is increased in the layering direction, which causes a problem of high haze value.

Recently, therefore, methods for overcoming the drawbacks of trying to achieve high hardness of hard-coated films, such as antiglare properties and increase in haze value, have been proposed, as disclosed in Japanese Patent Application Laid-Open (JP-A) Nos. 11-286083, 2000-326447, 2001-194504, and 2001-264508.

JP-A No. 11-286083 discloses a hard-coated antiglare film comprising a transparent substrate film and a hard-coating layer that is formed on the transparent substrate film and mainly composed of particles with an average particle size of 0.6 to 20 μm, fine particles with an average particle size of 1 to 500 nm and a hard-coating resin. It also discloses that the thickness of the hard-coating layer is at most the particle size of the particles, preferably at most 80% of the average particle size (specifically at most 16 μm).

JP-A No. 2000-326447 discloses a hard-coated film comprising a plastic substrate film and at least one hard-coating layer formed on at least one surface of the plastic substrate film, wherein the hard-coating layer has a thickness of 3 to 30 μm, and the hard-coating layer contains inorganic fine particles with secondary particle sizes of at most 20 μm. It also discloses that the surface of the hard-coating layer is provided with unevenness so as to provide antiglare properties.

JP-A No. 2001-194504 discloses an antireflection film comprising a plastic film and a laminate that is formed on at least one surface of the plastic film and comprises a hard-coating layer and thin antireflection film layer mainly composed of a metal alkoxide and a hydrolysate thereof, wherein the hard-coating layer has an elastic modulus of 0.7 to 5.5 GPa or lower at its breaking strain. It also discloses that the hard-coating layer has a thickness of 0.5 to 20 μm and that the hard-coating layer contains fine particles with an average particle size of 0.01 to 10 μm.

JP-A No. 2001-264508 discloses an antiglare antireflection film comprising a transparent support and a laminate that is formed on the transparent support and sequentially comprises an antiglare hard-coating layer containing particles with an average particle size of 1 to 10 μm and a low-refractive-index layer with a refractive index of 1.35 to 1.49 produced with a composition containing inorganic fine particles with an average particle size of 0.001 to 0.2 μm, a hydrolysate of a photo-curable organosilane and/or a partial condensate thereof, and a fluoropolymer, wherein the antiglare antireflection film has a haze value of 3 to 20% and an average reflectance of at most 1.8% at wavelengths of 450 nm to 650 nm. It also discloses that the antiglare hard-coating layer has a thickness of 1 to 10 μm.

However, in such conventional hard-coated antiglare films, problems in both hardness and antiglare properties have not been solved satisfactorily. In JP-A No. 11-286083, there is a problem in that when the hard-coating layer has a thickness approximately in the above-mentioned range, a sufficiently high hardness cannot be obtained. In JP-A No. 2000-326447, there is the following problem. That is, in such a structure as described above, no consideration is given to the surface roughness of the hard-coating layer surface, and when the structure allows the inorganic fine particles to be buried completely in the hard-coating layer, sufficiently high antiglare properties cannot be obtained. Although the antireflection film as described in JP-A No. 2001-194504 has improved hardness and scratch resistance, there is a problem in that for example, when fine particles with an average particle size of about 1.8 sum are added to a hard-coating layer with a thickness of about 20 Elm, fine particles are buried completely in the hard-coating layer and cannot provide sufficiently high antiglare properties. The antiglare antireflection film as described in JP-A No. 2001-264508 is intended to improve the scratch resistance, antiglare properties, etc., but there is a problem in that a sufficiently high hardness is not obtained.

SUMMARY OF THE INVENTION

An object of the present invention is to provide a hard-coated antiglare film, a method of manufacturing the same, an optical device, a polarizing plate, and an image display each including the same. The hard-coated antiglare film has high hardness, high scratch resistance and good antiglare properties.

In order to achieve the aforementioned object, a hard-coated antiglare film of the invention includes a transparent plastic film substrate and a hard-coating layer that contains fine particles and is formed on at least one surface of the transparent film substrate. The hard-coating layer has a thickness of 15 to 30 µm. The fine particles have a weight average particle size of 30 to 75% of a thickness of the hard-coating layer. An average tilt angle θa of an unevenness of the hard-coating layer surface is 0.4° to 1.5°. The hard-coating layer is formed using a material for forming the hard-coating layer (hereinafter also referred to as a "hard-coating material") containing Component A, Component B, and Component C described below:
Component A: at least one of urethane acrylate and urethane methacrylate;
Component B: at least one of polyol acrylate and polyol methacrylate; and
Component C: a polymer or copolymer that is formed of at least one of
Components C1 and C2 described below, or a mixed polymer of the polymer and the copolymer,
Component C1: alkyl acrylate having an alkyl group containing at least one of a hydroxyl group and an acryloyl group, and
Component C2: alkyl methacrylate having an alkyl group containing at least one of a hydroxyl group and an acryloyl group.

A manufacturing method of the present invention is a method of manufacturing a hard-coated antiglare film including a transparent plastic film substrate and a hard-coating layer formed on at least one surface of the transparent plastic film. The method includes: preparing a material for forming the hard-coating layer containing a resin for forming the hard-coating layer, fine particles and a solvent; forming a coating film by applying the material for forming the hard-coating layer onto at least one surface of the transparent plastic film substrate, and forming a hard-coating layer by curing the coating film. The hard-coating layer has a thickness of 15 to 30 µm. The fine particles have a weight average particle size of 30 to 75% of a thickness of the hard-coating layer. An average tilt angle θa of the unevenness of the hard-coating layer surface is 0.4° to 1.5°. The resin for forming the hard-coating layer contains Component A, Component B, and Component C described below:
Component A: at least one of urethane acrylate and urethane methacrylate;
Component B: at least one of polyol acrylate and polyol methacrylate; and
Component C: a polymer or copolymer that is formed of at least one of
Components C1 and C2 described below, or a mixed polymer of the polymer and the copolymer,
Component C1: alkyl acrylate having an alkyl group containing at least one of a hydroxyl group and an acryloyl group, and
Component C2: alkyl methacrylate having an alkyl group containing at least one of a hydroxyl group and an acryloyl group.

An optical device of the present invention includes an optical component and a hard-coated antiglare film of the present invention formed on at least one surface of the optical component.

A polarizing plate of the present invention includes a polarizer and the hard-coated antiglare film of the present invention.

An image display of the present invention includes a hard-coated antiglare film of the present invention, and an optical device of the present invention or a polarizing plate of the present invention.

Since the hard-coating layer has a thickness in the predetermined range, the hard-coated antiglare film of the present invention has a sufficiently high hardness. The hard-coated antiglare film of the present invention is excellent in not only antiglare properties but also scratch resistance since the particle size of the fine particles is in the predetermined range and the average tilt angle θa of the unevenness of the hard-coating layer surface is in the predetermined range. Accordingly, the image display including a hard-coated antiglare film of the present invention used therein has excellent handling properties due to suitable protection given to its screen and also has excellent image display properties due to excellent antiglare properties. In the hard-coated antiglare film of the present invention, since the hard-coating layer is formed using a resin for forming the hard-coating layer containing the aforementioned three components, it has an improved hardness, the hard-coating layer is prevented from cracking, and the hard-coated antiglare film can be effectively prevented from curling that is caused by the hardening and shrinking of the hard-coating layer. Such a high-performance, hard-coated antiglare film of the present invention can be manufactured by the manufacturing method of the present invention. However, the hard-coated antiglare film of the present invention also can be manufactured by other manufacturing methods.

DESCRIPTION OF THE EMBODIMENTS

In the hard-coated antiglare film and the method of manufacturing the same of the present invention, it is preferable that Component B contain at least one of pentaerythritol triacrylate and pentaerythritol tetraacrylate. This is because it allows sufficiently high hardness and flexibility to be maintained while curling can be prevented from occurring more effectively.

In the hard-coated antiglare film of the present invention, an antireflection layer can be formed on the hard-coating layer. The antireflection layer preferably contains hollow spherical silicon oxide ultrafine particles.

The hard-coated antiglare film preferably has a glossiness of 50 to 95 according to JIS K 7105. The "glossiness" means the 60° specular gloss according to JIS K 7105 (1981 version).

In the method of manufacturing the hard-coated antiglare film of the present invention, the solvent preferably contains ethyl acetate. This is because such a solvent allows the production of a hard-coating layer with good adhesion to the transparent plastic film substrate, and thereby the hard-coating layer can be prevented from being detached. Preferably, a content of the ethyl acetate is at least 20% by weight with respect to the whole solvent.

Next, the present invention is described in detail. The present invention, however, is not limited by the following description.

The hard-coated antiglare film of the present invention includes a transparent plastic film substrate and a hard-coating layer formed on one or both surfaces of the transparent plastic film substrate.

The transparent plastic film substrate is not particularly limited. Preferably, the transparent plastic film substrate has a high visible-light transmittance (preferably a light transmittance of at least 90%) and good transparency (preferably a haze value of at most 1%). Examples of the material for forming the transparent plastic film substrate include polyester type polymers, cellulose type polymers, polycarbonate type polymers, acrylics type polymers, etc. Examples of the polyester type polymers include polyethylene terephthalate, polyethylenenaphthalate, etc. Examples of the cellulose type polymers include diacetyl cellulose, triacetyl cellulose (TAC), etc. Examples of the acrylic type polymers include poly methylmethacrylate, etc. Examples of the material for forming the transparent plastic film substrate also include styrene type polymers, olefin type polymers, vinyl chloride type polymers, amide type polymers, etc. Examples of the styrene type polymers include polystyrene, acrylonitrile-styrene copolymer, etc. Examples of the olefin type polymers include polyethylene, polypropylene, polyolefin that has a cyclic or norbornene structure, ethylene-propylene copolymer, etc. Examples of the amide type polymers include nylon, aromatic polyamide, etc. The material for forming the transparent plastic film substrate also contain, for example, imide type polymers, sulfone type polymers, polyether sulfone type polymers, polyether-ether ketone type polymers, poly phenylene sulfide type polymers, vinyl alcohol type polymer, vinylidene chloride type polymers, vinyl butyral type polymers, allylate type polymers, polyoxymethylene type polymers, epoxy type polymers, blend polymers of the above-mentioned polymers, etc. Among them, those having small optical birefringence are used suitably. The hard-coated antiglare film of the present invention can be used as a protective film for a polarizing plate, for example. In such a case, the transparent plastic film substrate is preferably a film formed of triacetyl cellulose, polycarbonate, an acrylic polymer, a polyolefin having a cyclic or norbornene structure, etc. In the present invention, the transparent plastic film substrate may be a polarizer itself. Such a structure does not need a protective layer of TAC or the like and provides a simple polarizing plate structure and thus allows a reduction in the number of steps for manufacturing polarizing plates or image displays and an increase in production efficiency. In addition, such a structure can provide thinner polarizing plates. When the transparent plastic film substrate is a polarizer, the hard-coating layer serves as a protective layer in a conventional manner. In such a structure, the hard-coated film also functions as a cover plate, when attached to the surface of a liquid crystal cell.

In the present invention, the thickness of the transparent plastic film substrate is not particularly limited. For example, the thickness is preferably 10 to 500 μm, more preferably 20 to 300 μm, and most suitably 30 to 200 μm, in terms of strength, workability such as handling property, and thin layer property. The refractive index of the transparent plastic film substrate is not particularly limited. The refractive index is, for example, 1.30 to 1.80, preferably 1.40 to 1.70.

As described above, the hard-coating layer is formed, for example, using a resin for forming the hard-coating layer containing Component A, Component B, and Component C described below:

Component A: at least one of urethane acrylate and urethane methacrylate;

Component B: at least one of polyol acrylate and polyol methacrylate; and

Component C: a polymer or copolymer that is formed of at least one of

Components C1 and C2 described below, or a mixed polymer of the polymer and the copolymer, Component C1: alkyl acrylate having an alkyl group containing at least one of a hydroxyl group and an acryloyl group, and Component C2: alkyl methacrylate having an alkyl group containing at least one of a hydroxyl group and an acryloyl group.

Examples of the urethane acrylate and urethane methacrylate of Component A include those containing constituents such as acrylic acid, methacrylic acid, acrylic acid ester, methacrylic acid ester, a polyol, and a diisocyanate. For example, at least one of the urethane acrylate and urethane methacrylate can be produced by using a polyol and at least one monomer selected from acrylic acid, methacrylic acid, acrylic acid ester, and methacrylic acid ester, preparing at least one of a hydroxyacrylate having at least one hydroxyl group and a hydroxymethacrylate having at least one hydroxyl group, and allowing it to react with a diisocyanate. In Component A, one type of urethane acrylate or urethane methacrylate may be used alone, or two types or more of them may be used in combination.

Examples of the acrylic acid ester include alkyl acrylates, cycloalkyl acrylates, etc. Examples of the alkyl acrylates include methyl acrylate, ethyl acrylate, isopropyl acrylate, butyl acrylate, etc. Examples of the cycloalkyl acrylates include cyclohexyl acrylate, etc. Examples of the methacrylic acid ester include alkyl methacrylates, cycloalkyl methacrylates, etc. Examples of the alkyl methacrylates include methyl methacrylate, ethyl methacrylate, isopropyl methacrylate, butyl methacrylate, etc. Examples of the cycloalkyl methacrylates include cyclohexyl methacrylate, etc.

The polyol is a compound having at least two hydroxyl groups. Examples of the polyol include ethylene glycol, 1,3-propylene glycol, 1,2-propylene glycol, diethylene glycol, dipropylene glycol, neopentyl glycol, 1,3-butanediol, 1,4-butanediol, 1,6-hexanediol, 1,9-nonanediol, 1,10-decanediol, 2,2,4-trimethyl-1,3-pentanediol, 3-methyl-1,5-pentanediol, neopentylglycol hydroxypivalate ester, cyclohexane dimethylol, 1,4-cyclohexanediol, spiroglycol, tricyclodecane methylol, hydrogenated bisphenol A, ethylene oxide-added bisphenol A, propylene oxide-added bisphenol A, trimethylolethane, trimethylolpropane, glycerin, 3-methylpentane-1,3,5-triol, pentaerythritol, dipentaerythritol, tripentaerythritol, glucoses, etc.

The diisocyanate to be used herein can be any type of aromatic, aliphatic, or alicyclic diisocyanate. Examples of the diisocyanate include tetramethylene diisocyanate, hexamethylene diisocyanate, isophorone diisocyanate, 2,4-tolylene diisocyanate, 4,4-diphenyl diisocyanate, 1,5-naphthalene diisocyanate, 3,3-dimethyl-4,4-diphenyl diisocyanate, xylene diisocyanate, trimethyl hexamethylene diisocyanate, 4,4-diphenylmethane diisocyanate, and hydrogenated derivatives thereof.

The ratio of Component A to be added is not particularly limited. The use of Component A can improve the flexibility of the resulting hard-coating layer and adhesion of the resulting hard-coating layer with respect to the transparent plastic film substrate. From such viewpoints and the viewpoint of hardness of the hard-coating layer, the ratio of Component A to be added is, for example, 15 to 55% by weight, preferably 25 to 45% by weight, with respect to the entire resin components in the hard-coating material. The term "entire resin components" denotes the total amount of Components A, B, and C, or when other resin components are used, a sum of the total amount of the aforementioned three components and the total amount of the resin components. The same applies below.

Examples of Component B include pentaerythritol diacrylate, pentaerythritol triacrylate, pentaerythritol tetraacrylate, dipentaerythritol hexaacrylate, 1,6-hexanediol acrylate, pentaerythritol dimethacrylate, pentaerythritol trimethacrylate, pentaerythritol tetramethacrylate, dipentaerythritol hexamethacrylate, 1,6-hexanediol methacrylate, etc. These can be used alone. Two or more of them can be used in combination. Preferred examples of the polyol acrylate include a monomer component containing a polymer of pentaerythritol triacrylate and pentaerythritol tetraacrylate, and a component mixture containing pentaerythritol triacrylate and pentaerythritol tetraacrylate.

The ratio of Component B to be added is not particularly limited. The ratio of Component B to be added is preferably 70 to 180% by weight and more preferably 100 to 150% by weight, with respect to the amount of Component A. When the ratio of Component B to be added is 180% by weight or less with respect to the amount of Component A, the hard-coating layer to be formed can be effectively prevented from hardening and shrinking. As a result, the hard-coated antiglare film can be prevented from curling and the flexibility thereof can be prevented from deteriorating. When the ratio of Component B to be added is at least 70% by weight with respect to the amount of Component A, the hard-coating layer to be formed can have further improved hardness and improved scratch resistance.

In Component C, the alkyl groups of Components C1 and C2 are not particularly limited, for instance, the alkyl groups with a carbon number of 1 to 10. The alkyl groups can be of a straight chain. The alkyl groups can be of a branched-chain. For example, Component C can contain a polymer or copolymer containing a repeating unit represented by General Formula (1) indicated below, or a mixture of the polymer and the copolymer.

(1)

In General Formula (1), $R^1$ denotes —H or —$CH_3$, $R^2$ denotes —$CH_2CH_2OX$ or a group that is represented by General Formula (2) indicated below, and the X denotes —H or an acryloyl group that is represented by General Formula (3) indicated below.

In General Formula (2), the X denotes —H or an acryloyl group that is represented by General Formula (3), and Xs are identical to or different from each other.

Examples of Component C include a polymer, a copolymer, and a mixture of the polymer and the copolymer, with the polymer and a copolymer being formed of at least one monomer selected from the group consisting of 2,3-dihydroxypropyl acrylate, 2,3-diacryloyloxypropyl acrylate, 2-hydroxy-3-acryloyloxypropyl acrylate, 2-acryloyloxy-3-hydroxypropyl acrylate, 2,3-dihydroxypropyl methacrylate, 2,3-diacryloyloxypropyl methacrylate, 2-hydroxy-3-acryloyloxypropyl methacrylate, 2-acryloyloxy-3-hydroxypropyl methacrylate, 2-hydroxyethyl acrylate, 2-acryloyloxyethyl acrylate, 2-hydroxyethyl methacrylate, and 2-acryloyloxyethyl methacrylate.

The ratio of Component C to be added is not particularly limited. For instance, the ratio of Component C to be added is preferably 25 to 110% by weight and more preferably 45 to 85% by weight, with respect to the amount of Component A. When the ratio of Component C to be added is 110% by weight or lower with respect to the amount of Component A, the hard-coating material has excellent coating properties. When the ratio of Component C to be added is at least 25% by weight with respect to the amount of Component A, the hard-coating layer to be formed can be prevented from hardening and shrinking. As a result, in the hard-coated antiglare film, curling can be controlled.

The hard-coating layer contains fine particles to have an uneven structure at its surface. The fine particles can be inorganic or organic fine particles, for example. The inorganic fine particles are not particularly limited. Examples of the inorganic fine particles include fine particles made of silicon oxide, titanium oxide, aluminum oxide, zinc oxide, tin oxide, calcium carbonate, barium sulfate, talc, kaolin, calcium sulfate, etc. The organic fine particles are not particularly limited. Examples thereof include polymethyl methacrylate acrylate resin powder (PMMA fine particles), silicone resin powder, polystyrene resin powder, polycarbonate resin powder, acrylic-styrene resin powder, benzoguanamine resin powder, melamine resin powder, polyolefin resin powder, polyester resin powder, polyamide resin powder, polyimide resin powder, polyethylene fluoride resin powder, etc. One type of the inorganic and organic fine particles can be used alone. Alternatively, two types or more of them can be used in combination.

The weight average particle size of the fine particles is from 30 to 75% of the thickness of the hard-coating layer, preferably 30 to 50% of the thickness. When the weight average particle size of the fine particles is at least 30%, sufficient unevenness can be formed on the surface, and sufficient antiglare function can be provided. When the weight average particle size of the fine particles is 75% or lower, the surface unevenness can be advantageous, the appearance can be good, and reflected light can be scattered advantageously.

The shape of the fine particles is not particularly limited. The fine particles can be in the form of substantially spherical beads or may be of an indefinite shape such as powder, for instance. In the present invention, the fine particles are preferably of plural types with at least two different average particle sizes. This means that there are at least two groups (fine particle powder) each including a plurality of fine particles having one weight average particle size. As described above, the fine particles preferably have a substantially spherical shape, more preferably a substantially spherical shape with an aspect ratio of at most 1.5. This is because when the aspect ratio is at most 1.5, the average tilt angle θa of the unevenness of the hard-coating layer surface can be controlled more preferably.

The ratio of the fine particles to be added is not particularly limited but can be determined suitably. With respect to 100 parts by weight of the hard-coating material, the ratio of the fine particles to be added is, for instance, 2 to 70 parts by weight, preferably 4 to 50 parts by weight, more preferably 15 to 40 parts by weight.

The average tilt angle θa of the unevenness of the hard-coating layer surface is in the range of 0.4° to 1.5°. If the average tilt angle θa is at least 0.4°, excellent antiglare properties can be obtained. An average tilt angle θa of at most 1.5° allows the haze value to be obtained in a suitable range. In the present invention, the average tilt angle θa is preferably in the range of 0.5° to 1.2°, more preferably 0.6° to 1.1°. In the present invention, the average tilt angle θa can be controlled by suitably selecting, for example, the type of the resin for forming the hard-coating layer, the thickness of the hard-coating layer, the type of the fine particles, the average particle size of the fine particles, etc. Any person skilled in the art can control the average tilt angle θa in the predetermined range of the present invention without carrying out an excessive amount of trial and error.

In the present invention, the average tilt angle θa is a value defined by Expression (1) indicated below. The average tilt angle θa is a value measured by the method described later in the section of Examples.

$$\text{Average tilt angle } \theta a = \tan^{-1} \Delta a \quad (1)$$

Figure 3:
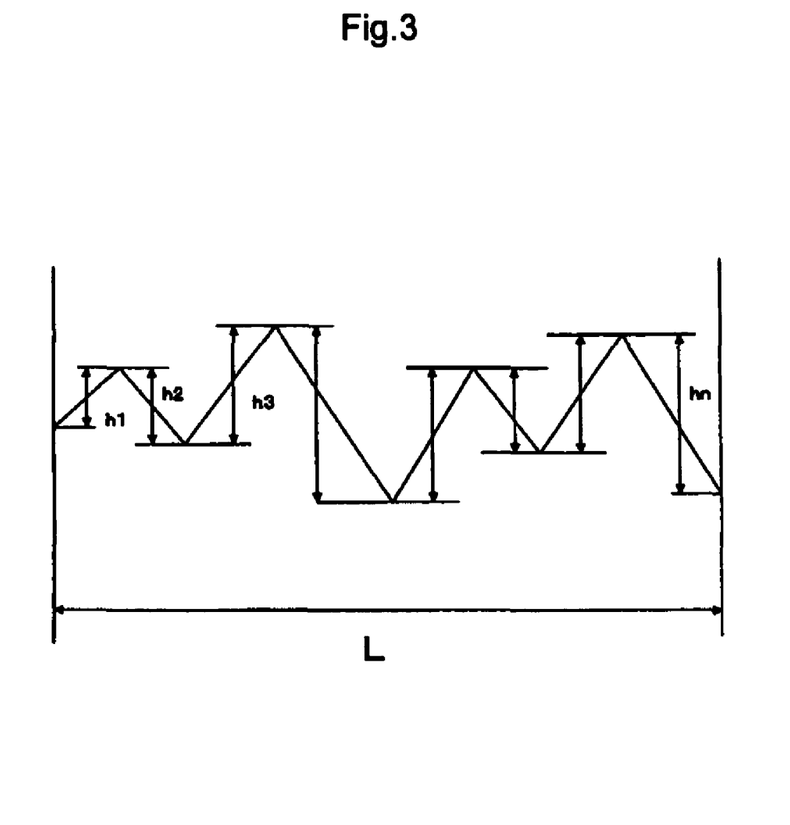
FIG. 3 is a schematic view showing an example of the relationship among the roughness curve, height h, and standard length L.

In Expression (1) described above, as indicated in Expression (2) below, $\Delta a$ denotes a value obtained by dividing the sum total ($h1+h2+h3 \ldots +hn$) of the differences (heights h) between adjacent peaks and the lowest point of the trough formed therebetween by the standard length L of the roughness curve defined in JIS B 0601 (1994 version). The roughness curve is a curve obtained by removing the surface waviness components with longer wavelengths than the predetermined one from the profile curve using a retardation compensation high-pass filter. The profile curve denotes a profile that appears at the cut surface when an object surface was cut in a plane perpendicular to the object surface. FIG. 3 shows examples of the roughness curve, height h, and standard line L.

$$\Delta a = (h1+h2+h3 \ldots +hn)/L \quad (2)$$

In the unevenness of the hard-coating layer, the arithmetic average roughness Ra (arithmetic average surface roughness Ra) that is one way of expressing that the surface roughness is, for example, in the range of 0.05 to 0.3 μm, preferably in the range of 0.07 to 0.2 μm, and more preferably in the range of 0.09 to 0.15 μm. The arithmetic average surface roughness Ra is one defined in JIS B 0601 (1994 version). The arithmetic average surface roughness Ra is measured by, for instance, the method described later in the section of Examples. In the present invention, the arithmetic average surface roughness Ra can be controlled by suitably selecting, for example, the type of the resin for forming the hard-coating layer, the thickness of the hard-coating layer, the type of fine particles, the weight average particle size of the fine particles, etc. Any person skilled in the art can control the arithmetic average surface roughness Ra in the aforementioned predetermined ranges without carrying out an excessive amount of trial and error.

From the viewpoints of preventing the occurrence of interference fringes or light scattering that is caused at the interfaces between the hard-coating layer and the fine particles, it is preferable that the difference in refractive index between the fine particles and the hard-coating layer be reduced. The interference fringes are phenomena that external light incident on the hard-coated film is reflected to produce rainbow color. Recently, three-wavelength fluorescent lamps featuring clear visibility are used frequently in offices, for example. Under the three-wavelength fluorescent lamps, the interference fringes appear conspicuously. Since the refractive index of the hard-coating layer is generally in the range of 1.4 to 1.6, the fine particles have preferably refractive indices close to the above-mentioned refractive index range. Preferably, the difference in refractive index between the fine particles and the hard-coating layer is smaller than 0.05.

The difference din refractive index between the transparent plastic film substrate and the hard-coating layer is preferably at most 0.04. When the difference d is at most 0.04, the interference fringes can be prevented from occurring. The difference d is more preferably at most 0.02.

The thickness of the hard-coating layer is 15 to 30 μm, preferably 18 to 25 μm. When the thickness is in the aforementioned predetermined ranges, the hard-coating layer has sufficiently high hardness (for example, a pencil hardness of at least 4 H). In addition, curling can be prevented from occurring further effectively, as long as the thickness is in the predetermined ranges.

The hard-coated antiglare film of the present invention can be manufactured by, for example, preparing a material for forming a hard-coating layer including a resin for forming a hard-coating layer containing the three components, the fine particles, and a solvent; forming a coating film by applying the material for forming the hard-coating layer onto at least one surface of the transparent plastic film substrate; and forming the hard-coating layer by curing the coating film.

The solvent is not particularly limited. Examples of the solvent include dibutyl ether, dimethoxymethane, dimethoxyethane, diethoxyethane, propylene oxide, 1,4-dioxane, 1,3-dioxolane, 1,3,5-trioxane, tetrahydrofuran, acetone, methyl ethyl ketone, diethyl ketone, dipropyl ketone, diisobutyl ketone, cyclopentanone, cyclohexanone, methylcyclohexanone, ethyl formate, propyl formate, n-pentyl formate, methyl acetate, ethyl acetate, methyl propionate, ethyl propionate, n-pentyl acetate, acetyl acetone, diacetone alcohol, methyl acetoacetate, ethyl acetoacetate, methanol, ethanol, 1-propanol, 2-propanol, 1-butanol, 2-butanol, 1-pentanol, 2-methyl-2-butanol, cyclohexanol, isobutyl acetate, methyl isobutyl ketone (MIBK), 2-octanone, 2-pentanone, 2-hexanone, 2-heptanone, 3-heptanone, ethylene glycol monoethyl ether acetate, ethylene glycol monoethyl ether, ethylene glycol monobutyl ether, ethylene glycol monomethyl ether, propylene glycol monomethyl ether acetate, propylene glycol monomethyl ether, etc. One of these solvents or any combination of two or more of these solvents may be used. From the viewpoints of improving the adhesion between the transparent plastic film substrate and the hard-coating layer, the solvent contains ethyl acetate whose ratio to the whole is preferably at least 20% by weight, more preferably at least 25% by weight, and most preferably 30 to 70% by weight. When the ratio of the ethyl acetate in the solvent is 70% by weight or less, the solvent can have a suitable rate of volatilization and thereby unevenness in coating or drying can be effectively prevented from occurring. The type of the solvent to be used in combination with the ethyl acetate is not particularly limited. Examples of the solvent include butyl acetate, methyl ethyl ketone, ethylene glycol monobutyl ether, propylene glycol monomethyl ether, etc.

Various types of leveling agents can be added to the hard-coating material. The leveling agent may be, for example, a fluorochemical or silicone leveling agent, preferably a silicone leveling agent. Examples of the silicon leveling agent include a reactive silicone, polydimethylsiloxane, polyether-modified polydimethylsiloxane, polymethylalkylsiloxane, etc. Among these silicone leveling agents, the reactive silicone is particularly preferred. The reactive silicone added can impart lubricity to the surface and produce continuous scratch resistance over a long period of time. In the case of using a reactive silicone containing a hydroxyl group, when an antireflection layer (a low refractive index layer) containing a siloxane component is formed on the hard-coating layer, the adhesion between the antireflection layer and the hard-coating layer is improved.

The amount of the leveling agent to be added is, for example, at most 5 parts by weight, preferably in the range of 0.01 to 5 parts by weight, with respect to 100 parts by weight of all the resin components.

If necessary, the hard-coating material may contain a pigment, a filler, a dispersing agent, a plasticizer, an ultraviolet absorbing agent, a surfactant, an antioxidant, a thixotropy-imparting agent, or the like, as long as the performance is not degraded. One of these additives may be used alone, or two or more of these additives may be used together.

The hard-coating material can contain any conventionally known photopolymerization initiator. Examples of the applicable photopolymerization initiator include 2,2-dimethoxy-2-phenylacetophenone, acetophenone, benzophenone, xanthone, 3-methylacetophenone, 4-chlorobenzophenone, 4,4'-dimethoxybenzophenone, benzoin propyl ether, benzyl dimethyl ketal, N,N,N',N'-tetramethyl-4,4'-diaminobenzophenone, 1-(4-isopropylphenyl)-2-hydroxy-2-methylpropane-1-one, and other thioxanthone compounds.

The hard-coating material may be applied onto the transparent plastic film substrate by any coating method such as fountain coating, die coating, spin coating, spray coating, gravure coating, roll coating, bar coating, etc.

The hard-coating material is applied to form a coating film on the transparent plastic film substrate and then the coating film is cured. Preferably, the coating film is dried before being cured. The drying can be carried out by, for instance, allowing it to stand, air drying by blowing air, drying by heating, or a combination thereof.

While the coating film formed of the hard-coating material may be cured by any method, ionizing radiation curing is preferably used. While any type of activation energy may be used for such curing, ultraviolet light is preferably used. Preferred examples of the energy radiation source include high-pressure mercury lamps, halogen lamps, xenon lamps, metal halide lamps, nitrogen lasers, electron beam accelerators, and radioactive elements. The amount of irradiation with the energy radiation source is preferably 50 to 5000 $mJ/cm^2$ in terms of accumulative exposure at an ultraviolet wavelength of 365 nm. When the amount of irradiation is at least 50 $mJ/cm^2$, the hard-coating material can be cured further sufficiently and the resulting hard-coating layer also has a sufficiently higher hardness. When the amount of irradiation is at most 5000 $mJ/cm^2$, the resulting hard-coating layer can be prevented from being colored and thereby can have improved transparency.

As described above, a hard-coated antiglare film of the present invention can be manufactured by forming the hard-coating layer on at least one surface of the transparent plastic film substrate. The hard-coated antiglare film of the present invention can be manufactured by manufacturing methods other than that described above. The hard-coated antiglare film of the present invention has a pencil hardness of at least 4 H, for example.

Figure 1:
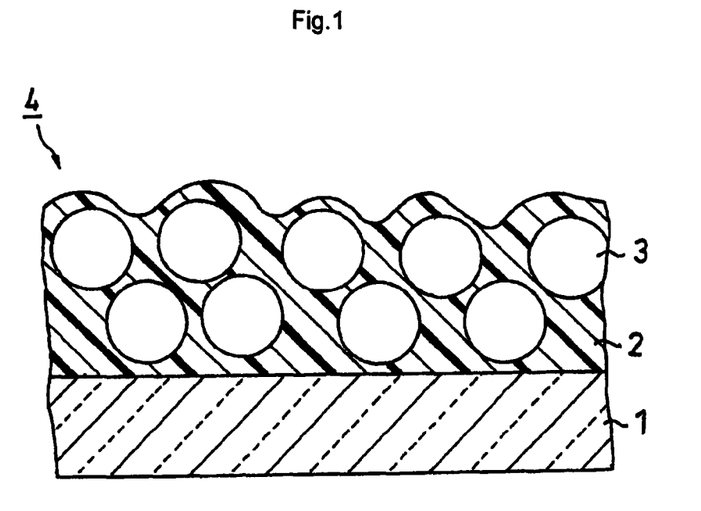
FIG. 1 is a cross-sectional view schematically showing the structure of a hard-coated antiglare film according to one embodiment of the present invention.

FIG. 1 is a cross-sectional view schematically showing an example of the hard-coated antiglare film of the present invention. As shown in FIG. 1, a hard-coated antiglare film 4 in this example includes a transparent plastic film substrate 1 and a hard-coating layer 2 that contains fine particles 3 and is formed on one surface of the transparent plastic film substrate 1. The present invention is not limited to the structure shown in FIG. 1. A hard-coated antiglare film can include a transparent plastic film substrate 1 and hard-coating layers 2, each of which is formed on each surface of the transparent plastic film substrate 1. The hard-coating layer 2 in this example is monolayer. However, the present invention is not limited to this. The hard-coating layer 2 may have a multilayer structure in which two or more layers are stacked together.

Figure 2:
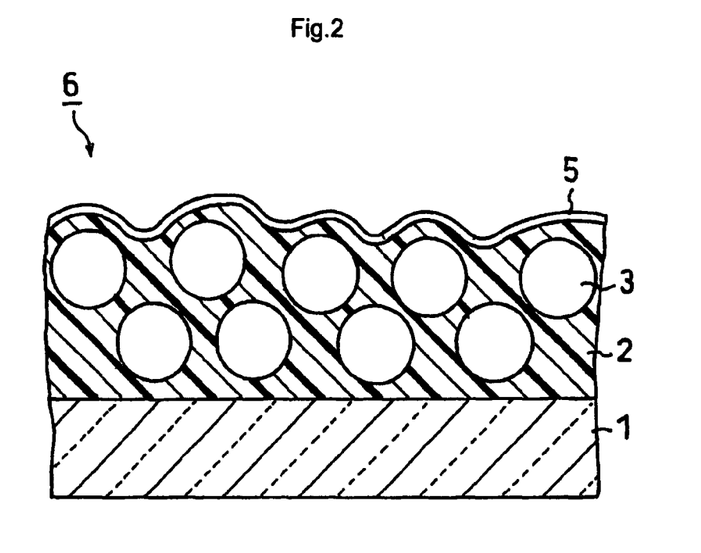
FIG. 2 is a cross-sectional view schematically showing the structure of a hard-coated antiglare film according to another embodiment of the present invention.

In the hard-coated antiglare film of the present invention, an antireflection layer (a low refractive index layer) may be formed on the hard-coating layer. FIG. 2 is a cross-sectional view schematically showing an example of a hard-coated antiglare film of the present invention including the antireflection layer. As shown in FIG. 2, a hard-coated antiglare film 6 in this example has a structure in which a hard-coating layer 2 contains fine particles 3 and is formed on one surface of the transparent plastic film substrate 1 and an antireflection layer 5 is formed on the hard-coating layer 2. Light incident on an object undergoes reflection at the interface, absorption and scattering in the interior, and any other phenomena repeatedly until it goes through the object and reaches the back side. For example, light reflection at the interface between air and a hard-coating layer is one of the factors in the reduction in visibility of the image on an image display equipped with the hard-coated antiglare film. The antireflection layer reduces such surface reflection. In the hard-coated antiglare film 6 shown in FIG. 2, the hard-coating layer 2 and the antireflection layer 5 are formed on one surface of the transparent plastic film substrate 1. However, the present invention is not limited to this. In a hard-coated antiglare film of the present invention, the hard-coating layer 2 and the antireflection layer 5 may be formed on both surfaces of the transparent plastic film substrate 1. In the hard-coated antiglare film 6 shown in FIG. 2, the hard-coating layer 2 and the antireflection layer 5 each are a monolayer. However, the present invention is not limited to this. The hard-coating layer 2 and the antireflection layer 5 each may have a multilayer structure in which at least two layers are stacked together.

In the present invention, the antireflection layer is a thin optical film having a strictly controlled thickness and refractive index, or a laminate including at least two layers of the thin optical films that are stacked together. In the antireflection layer, the antireflection function is produced by allowing opposite phases of incident light and reflected light to cancel each other out based on interference of light. The antireflection function should be produced in the visible light wavelength range of 380 to 780 nm, and the visibility is particularly high in the wavelength range of 450 to 650 nm.

Preferably, the antireflection layer is designed to have a minimum reflectance at the center wavelength 550 nm of the range.

When the antireflection layer is designed based on interference of light, the interference effect can be enhanced by a method of increasing the difference in refractive index between the antireflection layer and the hard-coating layer. Generally, in an antireflection multilayer including two to five thin optical layers (each with strictly controlled thickness and refractive index) that are stacked together, components with different refractive indices from each other are used to form a plurality of layers with a predetermined thickness. Thus, the antireflection layer can be optically designed at a higher degree of freedom, the antireflection effect can be enhanced, and in addition, the spectral reflection characteristics can be made flat in the visible light range. Since each layer of the thin optical film must be precise in thickness, a dry process such as vacuum deposition, sputtering, CVD, etc. is generally used to form each layer.

For the antireflection multilayer, a two-layer laminate is preferred including a high-refractive-index titanium oxide layer (refractive index: about 1.8) and a low-refractive-index silicon oxide layer (refractive index: about 1.45) formed on the titanium oxide layer. A four-layer laminate is more preferable wherein a silicon oxide layer is formed on a titanium oxide layer, another titanium oxide is formed thereon, and then another silicon oxide layer is formed thereon. The formation of the antireflection layer of such a two- or four-layer laminate can evenly reduce reflection over the visible light wavelength range (for example, 380 to 780 nm).

The antireflection effect can also be produced by forming a thin monolayer optical film (an antireflection layer) on the hard-coating layer. The antireflection monolayer is generally formed using a coating method such as a wet process, for example, fountain coating, die coating, spin coating, spray coating, gravure coating, roll coating, or bar coating.

Examples of the material for forming an antireflection monolayer include: resin materials such as UV-curable acrylic resins; hybrid materials such as a dispersion of inorganic fine particles such as colloidal silica in a resin; and sol-gel materials containing metal alkoxide such as tetraethoxysilane and titanium tetraethoxide. Preferably, the material contains a fluorine group to impart anti-fouling surface properties. In terms of, for example, scratch resistance, the material preferably contains a large amount of an inorganic component, and the sol-gel materials are more preferable. Partial condensates of the sol-gel materials can be used.

The antireflection layer (the low-refractive-index layer) is preferably formed of a material that contains, as disclosed in JP-A No. 2004-167827, a siloxane oligomer with an ethylene glycol-equivalent number average molecular weight of 500 to 10000 and a fluorine compound having a polystyrene-equivalent number average molecular weight of at least 5000 and having a fluoroalkyl structure and a polysiloxane structure since both scratch resistance and low reflection can be obtained, for example.

The antireflection layer (the low-refractive-index layer) may contain an inorganic sol for increasing film strength. The inorganic sol is not particularly limited. Examples thereof include silica, alumina, magnesium fluoride, etc. Particularly, silica sol is preferred. The amount of the inorganic sol to be added is, for example, in the range of 10 to 80 parts by weight, based on 100 parts by weight of the total solids of the material for forming the antireflection layer. The size of the inorganic fine particles in the inorganic sol is preferably in the range of 2 to 50 nm, more preferably 5 to 30 nm.

The material for forming the antireflection layer preferably contains hollow spherical silicon oxide ultrafine particles. The silicon oxide ultrafine particles have preferably an average particle size of 5 to 300 nm, more preferably 10 to 200 nm. The silicon oxide ultrafine particles are in the form of hollow spheres each including a pore-containing outer shell in which a hollow is formed. The hollow contains at least one of a solvent and a gas that has been used for preparing the ultrafine particles. A precursor substance for forming the hollow of the ultrafine particle preferably remains in the hollow. The thickness of the outer shell is preferably in the range of about 1 to about 50 nm and in the range of approximately $\frac{1}{50}$ to $\frac{1}{5}$ of the average particle size of the ultrafine particles. The outer shell preferably includes a plurality of coating layers. In the ultrafine particles, the pore is preferably blocked, and the hollow is preferably sealed with the outer shell. This is because the antireflection layer holding a porous structure or a hollow of the ultrafine particles can have a reduced refractive index of the antireflection layer. The method of producing such hollow spherical silicon oxide ultrafine particles is preferably a method of producing silica fine particles as disclosed in JP-A No. 2000-233611, for example.

In the process of forming the antireflection layer (the low-refractive-index layer), while drying and curing may be performed at any temperature, they are performed at a temperature of, for example, 60 to 150° C., preferably 70 to 130° C., for a time period of, for instance, 1 minute to 30 minutes, preferably 1 minute to 10 minutes in view of productivity. After drying and curing, the layer may be further heated, so that a hard-coated antiglare film of high hardness including an antireflection layer can be obtained. While the heating may be performed at any temperature, it is performed at a temperature of, for example, 40 to 130° C., preferably 50 to 100° C., for a time period of, for instance, 1 minute to 100 hours, more preferably at least 10 hours in terms of improving scratch resistance. The temperature and the time period are not limited to the above range. The heating can be performed by a method using a hot plate, an oven, a belt furnace, or the like.

When the hard-coated antiglare film including the antireflection layer is attached to an image display, the antireflection layer may serve frequently as the uppermost surface and thus tends to be susceptible to stains from the external environment. Stains are more conspicuous on the antireflection layer than on, for instance, a simple transparent plate. In the antireflection layer, for example, deposition of stains such as fingerprints, thumbmarks, sweat, and hairdressings changes the surface reflectance, or the deposition stands out whitely to make the displayed content unclear. Preferably, an antistain layer formed of a fluoro-silane compound, a fluoro-organic compound, or the like is layered on the antireflection layer in order to impart the functions of antideposition and easy elimination of the stains.

With respect to the hard-coated antiglare film of the present invention, it is preferable that at least one of the transparent plastic film substrate and the hard-coating layer be subjected to a surface treatment. When the surface treatment is performed on the transparent plastic film substrate, adhesion thereof to the hard-coating layer, the polarizer, or the polarizing plate further improves. When the surface treatment is performed on the hard-coating layer, adhesion thereof to the antireflection layer, the polarizer, or the polarizing plate further improves. The surface treatment can be, for example, a low-pressure plasma treatment, an ultraviolet radiation treatment, a corona treatment, a flame treatment, or an acid or alkali treatment. When a triacetyl cellulose film is used for the transparent plastic film substrate, an alkali treatment is preferably used as the surface treatment. This alkali treatment can be carried out by allowing the surface of the triacetyl cellulose film to come into contact with an alkali solution, washing it with water, and drying it. The alkali solution can be a potassium hydroxide solution or a sodium hydroxide solution, for example. The normal concentration (molar concentration) of the hydroxide ions of the alkali solution is preferably in the range of 0.1 N (mol/L) to 3.0 N (mol/L), more preferably 0.5 N (mol/L) to 2.0 N (mol/L).

In a hard-coated antiglare film including the transparent plastic film substrate and the hard-coating layer formed on one surface of the transparent plastic film substrate, for the purpose of preventing curling, the surface opposite to the surface with the hard-coating layer formed thereon may be subjected to a solvent treatment. The solvent treatment can be carried out by allowing the transparent plastic film substrate to come into contact with a dissolvable or swellable solvent. With the solvent treatment, the transparent plastic film substrate can have a tendency to curl toward the other surface, which can cancel the force allowing the transparent plastic film substrate with the hard-coating layer to curl toward the hard-coating layer side and thus can prevent curling. Similarly, in the hard-coated antiglare film including the transparent plastic film substrate and the hard-coating layer formed on one surface of the transparent plastic film substrate, for the purpose of preventing curling, a transparent resin layer may be formed on the other surface. The transparent resin layer is, for example, a layer that is mainly composed of a thermoplastic resin, a radiation-curable resin, a thermo-setting resin, or any other reactive resin. In particular, a layer mainly composed of a thermoplastic resin is preferred.

The transparent plastic film substrate side of the hard-coated antiglare film of the present invention is generally bonded to an optical component for use in an LCD or ELD via a pressure-sensitive adhesive or an adhesive. Before the bonding, the transparent plastic film substrate surface may also be subjected to various surface treatments as described above.

For example, the optical component can be a polarizer or a polarizing plate. A polarizing plate including a polarizer and a transparent protective film formed on one or both surfaces of the polarizer is commonly used. If the transparent protective film is formed on both surfaces of the polarizer, the front and rear transparent protective films may be made of the same material or different materials. Polarizing plates are generally placed on both surfaces of a liquid crystal cell. Polarizing plates may be arranged such that the absorption axes of two polarizing plates are substantially perpendicular to each other.

Next, an optical device including a hard-coated film of the present invention stacked therein is described using a polarizing plate as an example. The hard-coated film of the present invention and a polarizer or polarizing plate may be laminated with an adhesive or a pressure-sensitive adhesive to form a polarizing plate having the function according to the invention.

The polarizer is not especially limited. Examples of the polarizer include: a film that is uniaxially stretched after a hydrophilic polymer film, such as a polyvinyl alcohol type film, a partially formalized polyvinyl alcohol type film, an ethylene-vinyl acetate copolymer type partially saponified film, etc., allowed to adsorb dichromatic substances such as iodine and a dichromatic dye; and polyene type oriented films, such as a dehydrated polyvinyl alcohol film, a dehydrochlorinated polyvinyl chloride film, etc. Especially, a polarizer formed of a polyvinyl alcohol type film and a dichromatic material such as iodine is preferred because it has a high polarization dichroic ratio. Although the thickness of the polarizer is not especially limited, the thickness of about 5 to 80 μm is commonly adopted.

A polarizer that is uniaxially stretched after a polyvinyl alcohol type film is dyed with iodine can be produced by dipping and dyeing a polyvinyl alcohol type film in an aqueous solution of iodine and then stretching it by 3 to 7 times the original length. The aqueous solution of iodine may contain boric acid, zinc sulfate, zinc chloride, etc., if necessary. Separately, the polyvinyl alcohol type film may be dipped in an aqueous solution containing boric acid, zinc sulfate, zinc chloride, etc. Furthermore, before dyeing, the polyvinyl alcohol type film may be dipped in water and rinsed if needed. Rinsing the polyvinyl alcohol type film with water allows soils and blocking inhibitors on the polyvinyl alcohol type film surface to be washed off and also provides an effect of preventing ununiformity, such as unevenness of dyeing, that may be caused by swelling the polyvinyl alcohol type film. Stretching may be applied after dyeing with iodine or may be applied concurrently with dyeing, or conversely, dyeing with iodine may be applied after stretching. Stretching can be carried out in aqueous solutions, such as boric acid, potassium iodide, etc. or in water baths.

The transparent protective film formed on one or both surfaces of the polarizer preferably is excellent in transparency, mechanical strength, thermal stability, moisture-blocking properties, retardation value stability, or the like. Examples of the material for forming the transparent protective film include the same materials as those used for the transparent plastic film substrate.

Moreover, the polymer films described in JP-A No. 2001-343529 (WO01/37007) also can be used as the transparent protective film. The polymer films described in JP-A No. 2001-343529 are formed of, for example, resin compositions including (A) thermoplastic resins having at least one of a substituted imide group and a non-substituted imide group in the side chain thereof, and (B) thermoplastic resins having at least one of a substituted phenyl group and a non-substituted phenyl group and a nitrile group in the side chain thereof. Examples of the polymer films formed of the resin compositions described above include one formed of a resin composition including: an alternating copolymer containing isobutylene and N-methyl maleimide; and an acrylonitrile-styrene copolymer. The polymer film can be produced by extruding the resin composition in the form of film. The polymer film exhibits a small retardation and a small photoelastic coefficient and thus can eliminate defects such as unevenness due to distortion when a protective film or the like used for a polarizing plate. The polymer film also has low moisture permeability and thus has high durability against moistening.

In terms of polarizing properties, durability, and the like, cellulose resins such as triacetyl cellulose and norbornene resins are preferably used for the transparent protective film. Examples of the transparent protective film that are commercially available include FUJITAC (trade name) manufactured by Fuji Photo Film Co., Ltd., ZEONOA (trade name) manufactured by Nippon Zeon Co., Ltd., and ARTON (trade name) manufactured by JSR Corporation.

The thickness of the transparent protective film is not particularly limited. It is, for example, in the range of 1 to 500 μm in viewpoints of strength, workability such as a handling property, a thin layer property, etc. In the above range, the transparent protective film can mechanically protect a polarizer and can prevent a polarizer from shrinking and retain stable optical properties even when exposed to high temperature and high humidity. The thickness of the transparent protective film is preferably in the range of 5 to 200 μm and more preferably 10 to 150 μm.

The polarizing plate in which the hard-coated antiglare film is stacked is not particularly limited. The polarizing plate may be a laminate of the hard-coated film, the transparent protective film, the polarizer, and the transparent protective film that are stacked in this order or a laminate of the hard-coated film, the polarizer, and the transparent protective film that are stacked in this order.

Hard-coated antiglare films of the present invention and various optical devices, such as polarizing plates, including the hard-coated antiglare films can be preferably used in various image displays such as a liquid crystal display, etc. The liquid crystal display of the present invention has the same configuration as those of conventional liquid crystal displays except for including a hard-coated film of the present invention. The liquid crystal display of the present invention can be manufactured by suitably assembling several parts such as a liquid crystal cell, optical components such as a polarizing plate, and, if necessity, a lighting system (for example, a backlight), and incorporating a driving circuit, for example. The liquid crystal cell is not particularly limited. The liquid crystal cell can be of any type such as TN type, STN type, π type, etc.

In the present invention, the configurations of liquid crystal displays are not particularly limited. The liquid crystal displays of the present invention include, for example, one in which the optical device is disposed on one side or both sides of a liquid crystal cell, one in which a backlight or a reflector is used for a lighting system, etc. In these liquid crystal displays, the optical device of the present invention can be disposed on one side or both sides of the liquid crystal cell. When disposing the optical devices in both the sides of the liquid crystal cell, they may be identical to or different from each other. Furthermore, various optical components and optical parts such as a diffusion plate, an antiglare layer, an antireflection film, a protective plate, a prism array, a lens array sheet, an optical diffusion plate, backlight, etc. may be disposed in the liquid crystal displays.

EXAMPLES

Next, examples of the present invention are described together with comparative examples. However, the present invention is not limited by the following examples and comparative examples.

Example 1

A resin material (GRANDIC PC 1071 (trade name), manufactured by DAINIPPON INK AND CHEMICALS, INCORPORATED) was prepared. The resin material contained a resin component containing Component A, Component B, Component C and a photopolymerization initiator in a mixed solvent of ethyl acetate and butyl acetate at a solid concentration of 66% by weight. Then 30 parts by weight of PMMA particles with a weight average particle size of 10 μm (refractive index: 1.49) and 0.5 parts by weight of a leveling agent were added thereto. Thereafter, the resin material to which the PMMA particles and the leveling agent had been added was diluted with ethyl acetate in such a manner that butyl acetate: ethyl acetate (weight ratio)=55:45 (i.e. the ratio of ethyl acetate to the whole solvent was 45% by weight) and a solid concentration of 55% by weight was obtained. Thus a hard-coating material was prepared. The leveling agent was a copolymer having a molar ratio of dimethylsiloxane:hydroxypropylsiloxane:(6-isocyanate hexyl)isocyanuric acid:an aliphatic polyester=6.3:1.0:2.2:1.0.

Component A: urethane acrylate produced with pentaerythritol acrylate and hydrogenated xylene diisocyanate (100 parts by weight)
Component B: 49 parts by weight of dipentaerythritol hexaacrylate (hereinafter referred to as Component B1 (monomer)), 41 parts by weight of pentaerythritol tetraacrylate (hereinafter referred to as Component B4 (monomer)), and 24 parts by weight of pentaerythritol triacrylate (hereinafter referred to as Component B5 (monomer))
Component C: a polymer or copolymer having a repeating unit represented by General Formula (1) described above, or a mixture of the polymer and copolymer (59 parts by weight)
Photopolymerization initiator: IRGACURE 184 (trade name, manufactured by Ciba Specialty Chemicals), 3 parts by weight
Mixed solvent: butyl acetate:ethyl acetate (weight ratio)=89:11

The hard coating material was applied onto a transparent plastic film substrate (an 80 μm-thick triacetyl cellulose film (with a refractive index of 1.48)) with a bar coater to form a coating film. Thereafter, the coating film was dried by heating it at 100° C. for one minute. The coating film that had been dried was irradiated with ultraviolet light at an accumulated light intensity of 300 mJ/cm$^2$ using a metal halide lamp to be cured. Thus a hard-coating layer with a thickness of 20 μm was formed. In this manner, a hard-coated antiglare film according to the present example was produced.

Example 2

In this example, a hard-coated antiglare film was produced in the same manner as in Example 1 except that the addition amount of the PMMA particles was changed to 15 parts by weight.

Example 3

In this example, a hard-coated antiglare film was produced in the same manner as in Example 1 except that PMMA particles with a weight average particle size of 15 μm (refractive index: 1.49) were added in an amount of 30 parts of weight and that the solids concentration was changed to 35% by weight.

Example 4

In this example, a hard-coated antiglare film was produced in the same manner as in Example 1 except that PMMA particles with a weight average particle size of 8 μm (refractive index: 1.49) were added in an amount of 30 parts of weight and that the thickness of the hard-coating layer was changed to 16 μm.

Example 5

In this example, a hard-coated antiglare film was produced in the same manner as in Example 1 except that the thickness of the hard-coating layer was changed to 16 μm.

Example 6

In this example, a hard-coated antiglare film was produced in the same manner as in Example 1 except that the thickness of the hard-coating layer was changed to 29 μm.

Example 7

In this example, a hard-coated antiglare film was produced in the same manner as in Example 1 except that PMMA particles with a weight average particle size of 15 μm (refractive index: 1.49) were added in an amount of 30 parts of weight and that the thickness of the hard-coating layer was changed to 23 μm.

Example 8

In this example, a hard-coated antiglare film was produced in the same manner as in Example 1 except that an antireflection layer was formed on the hard-coating layer.

The antireflection layer was formed as follows. That is, first, as the material for forming the antireflection layer, COLCOAT N103 (trade name, manufactured by COLCOAT Co., Ltd., with a solid content of 2% by weight) was provided as a siloxane oligomer with ethylene glycol-equivalent number average molecular weights of 500 to 10000. Subsequently, the number average molecular weight of the siloxane oligomer was measured. As a result, the number average molecular weight was 950. Next, OPSTAR JTA105 (trade name, manufactured by JSR Corporation, with a solid content of 5% by weight) was provided as a fluorine compound having a fluoroalkyl structure and a polysiloxane structure and a polystyrene-equivalent number average molecular weight of 5000 or more. Then the number average molecular weight of the fluorine compound was measured. As a result, the polystyrene-equivalent number average molecular weight was 8000. JTA105A (trade name, manufactured by JSR Corporation, with a solid content of 5% by weight) was provided as a curing agent.

Subsequently, the material for forming the antireflection layer was prepared by mixing 100 parts by weight of OPSTAR JTA 105, 1 part by weight of JTA105A, 590 parts by weight of COLCOAT N103, and 151.5 parts by weight of butyl acetate. This material for forming the antireflection layer was applied onto the hard-coating layer with a die coater so as to have the same width as that of the hard-coating layer. Thereafter, it was dried and cured by heating at 120° C. for three minutes to form the antireflection layer (a low-refractive-index layer with a thickness of 0.1 μm and a refractive index of 1.43).

Example 9

In this example, a hard-coated antiglare antireflection film was produced in the same manner as in Example 1 except that an antireflection layer was formed on the hard-coating layer of the hard-coated antiglare film as obtained in Example 1.

The antireflection layer was formed as follows. The material for forming the antireflection layer was prepared by dispersing 100 parts by weight of dipentaerythritol acrylate, 15 parts by weight of silicone polymer having a methacryloxypropyl group and a butyl group, 2.5 parts by weight of hexanediol acrylate, 6 parts by weight of a Lucirin type photopolymerization initiator, and hollow spherical silicon oxide ultrafine particles with a diameter of 60 nm surface-treated and made hydrophobic with silane coupling agent having an acrylic group into a mixed solvent of IPA/MIBK/butyl cellosolve/toluene (80/9/10.5/0.5) in such a manner that a solids content of 3% by weight was obtained. This antireflection layer-forming material was used to form the antireflection layer on the hard-coating layer by the same method and under the same conditions as in Example 7.

Example 10

A hard-coated antiglare film according to this example was produced in the same manner as in Example 1. The coating liquid as described below was then applied onto the triacetyl cellulose film surface that had not been hard-coated (the surface opposite to the surface where the hard-coating layer had been formed) with a wire bar so as to provide a wet thickness of 20 μm and thereby a coating film was formed. Thereafter, the coating film was dried at 80° C. for one minute. The coating liquid used herein was prepared by a mixed solvent of acetone, ethyl acetate, and isopropyl alcohol (IPA) (37:58:5).

Example 11

A hard-coated antiglare film according to this example was produced in the same manner as in Example 1. The coating liquid as described below was then applied onto the triacetyl cellulose film surface that had not been hard-coated (the surface opposite to the surface where the hard-coating layer had been formed) with a wire bar so as to provide a wet thickness of 20 μm and thereby a coating film was formed. Thereafter, the coating film was dried at 80° C. for one minute. The coating liquid used herein was prepared by adding diacetyl cellulose to a mixed solvent of acetone, ethyl acetate, and isopropyl alcohol (IPA) (37:58:5) so as to have a diacetyl cellulose solid concentration of 0.5%.

Example 12

In this example, a hard-coated antiglare film was produced in the same manner as in Example 1 except that the leveling agent was not used.

Comparative Example 1

A hard-coating material was prepared by diluting 100 parts by weight of an urethane acrylate-based UV-curable resin, 15 parts by weight of polystyrene particles with a weight average particle size of 3.5 μm (refractive index: 1.59), 0.5 parts by weight of a leveling agent (trade name: MEGAFAC F-407N manufactured by Dainippon Ink and Chemicals, Incorporated), 2.5 parts by weight of a synthetic smectite, and 5 parts by weight of photopolarization initiator (trade name: IRGACURE 907 manufactured by Ciba Specialty Chemicals) with a mixed solvent of butyl acetate and toluene (13:87, weight ratio) in such a manner that a solids concentration of 35% by weight.

Next, the hard coating material was applied onto a transparent plastic film substrate (an 80 μm-thick triacetyl cellulose film (with a refractive index of 1.48)) with a bar coater to form a coating film. Thereafter, the coating film was dried by heating it at 100° C. for one minute. The coating film that had been dried was irradiated with ultraviolet light at an accumulated light intensity of 300 mJ/cm$^2$ using a metal halide lamp to be cured. Thus a hard-coating layer with a thickness of 5 μm was formed. In this manner, a hard-coated antiglare film according to the present example was produced.

Comparative Example 2

In this comparative example, a hard-coated antiglare film was produced in the same manner as in Example 1 except that the addition amount of the PMMA particles was changed to 3 parts by weight.

Comparative Example 3

In this comparative example, a hard-coated antiglare film was produced in the same manner as in Example 1 except that the addition amount of the PMMA particles was changed to 70 parts by weight.

Comparative Example 4

In this comparative example, a hard-coated antiglare film was produced in the same manner as in Comparative Example 1 except that PMMA particles with a weight average particle size of 3 μm (refractive index: 1.49) was alternatively used as the fine particles and that the addition amount of the particles was changed to 30 parts by weight.

Evaluation

In the respective examples and comparative examples, various characteristics were evaluated or measured by the following methods.

Thickness of Hard-Coating Layer

A thickness gauge (microgauge type manufactured by Mitutoyo Corporation) was used to measure the total thickness of the hard-coated antiglare film. The thickness of the transparent plastic film substrate was subtracted from the total thickness. Thus the thickness of the hard-coating layer was calculated. The results are shown in Table 1 below.

Thickness of Antireflection Layer

An instantaneous multichannel photodetector system (MCPD-2000 (trade name) manufactured by Otsuka Electronics Co., Ltd.) was used and the thickness of the antireflection layer was calculated from the waveform data of the resulting interference spectrum.

Haze

A haze meter HR300 (trade name, manufactured by Murakami Color Research Laboratory) was used to measure haze according to JIS K 7136 (1981 version) (haze (cloudiness)). The results are shown in Table 1 below.

Glossiness

Glossiness was measured according to JIS K 7105 (1981 version) at a measurement angle of 60° with Digital Variable Gloss Meter UGV-5DP manufactured by Suga Test Instrument Co., Ltd. The results are shown in Table 1 below.

Pencil Hardness

A hard-coated antiglare film was placed on a glass plate, with the surface on which the hard-coating layer was not formed facing downward. Then the surface of the hard-coating layer was subjected to a pencil hardness test according to JIS K-5400 (with a load of 500 g). Thus, the pencil hardness thereof was measured. The results are shown in Table 1 below.

Scratch Resistance

The value corresponding to the degree of scratch resistance of the hard-coated antiglare film was determined by the following test procedure. The results are shown in Table 1 below.

(1) The sample was cut into a piece of at least 25 mm width and at least 100 mm length. This was placed on a glass plate.

(2) Steel wool #0000 was uniformly attached onto a smooth cross section of a cylinder with a diameter of 25 mm. The cylinder with the steel wool was reciprocated 30 times at a speed of approximately 100 mm/sec on the surface of the sample under a load of 1.5 kg. And then scratch resistance is visually evaluated using the follow criteria:

A: no scratch
B: small scratches with no influence on visibility
C: significant scratches and loss of visibility Arithmetic Average Surface Roughness Ra and Average Tilt Angle θa A glass plate (thickness: 1.3 mm) manufactured by Matsunami Glass Ind., Ltd. was bonded to the hard-coated antiglare film surface with no hard-coating layer formed thereon, using a pressure-sensitive adhesive. Then the shape of the hard-coating layer surface was measured using a high-precision micro figure measuring instrument (SURFCORDER ET4000 (trade name), manufactured by Kosaka Laboratory Ltd.). Thereafter, the arithmetic average surface roughness Ra and average tilt angle θa were determined. The results are shown in Table 1 below. The high precision micro figure measuring instrument automatically calculates the arithmetic average surface roughness Ra and average tilt angle θa.

Reflectance

A black acrylic plate (2.0 mm in thickness, manufactured by Mitsubishi Rayon Co., Ltd.) was bonded to the hard-coated antiglare film surface on which no hard-coating layer was formed, with an approximately 20-μm thick adhesive layer formed thereon. This eliminated reflection at the back surface of the hard-coated antiglare film. This hard-coated antiglare film was measured for reflectance of the surface of the hard-coating layer. The spectral reflectance (specular reflectance+diffuse reflectance) was measured using a spectrophotometer UV2400PC (trade mark, with an 8°-inclined integrating sphere, manufactured by Shimadzu Corporation). The reflectance was calculated according to the formula: C illuminant/total reflection index of 2° visual field (Y value). The results are shown in Table 1 below.

Refractive Index of Hard-Coating Layer

The refractive index of a hard-coating layer was measured using a multiwavelength Abbe refractometer (manufactured by Atago Co., Ltd., trade name: DR-M2/1550). The results are shown in Table 1 below.

Refractive Index of Fine Particles

Fine particles were placed on a slide glass, and a refractive index standard solution was dropped on the fine particles. Thereafter, a cover glass was placed thereon. Thus a sample was prepared. The sample was observed with a microscope and thereby the refractive index of the refractive index standard solution that was obtained at the point where the profiles of the fine particles were most difficult to view at the interface with the refractive index standard solution was used as the refractive index of the fine particles. The results are shown in Table 1 below.

Adhesion

The adhesion of the hard-coating layer to the transparent plastic film substrate was evaluated by performing the cross-cut adhesion test according to JIS K 5400. The peeling test was performed 100 times. The number of detached portions of the hard-coating layer from the transparent plastic film substrate was counted. The results are shown in the form of the number of detachment/100 in Table 1 below.

Weight Average Particle Size of Fine Particles

By the Coulter counting method, a particle size distribution measurement apparatus (trade name: Coulter Multisizer, manufactured by Beckman Coulter, Inc.) using a pore electrical resistance method was employed to measure electrical resistance of an electrolyte corresponding to the volumes of the fine particles when the fine particles passed through the pores. Thus the number and volume of the fine particles were measured and then the weight average particle size of the fine particles was calculated. The results are indicated in Table 1 below.

TABLE 1

|  | Thickness of Hard-Coating Layer (um) | Blending Amount of Fine Particles (wt %) | Refractive Index of Hard-Coating Layer | Particle Size (um) | Refractive Index of Fine Particles | Relative Particle Size (%) | Haze | Glossiness |
|---|---|---|---|---|---|---|---|---|
| Example 1 | 20 | 30 | 1.51 | 10 | 1.49 | 50 | 62.5 | 77 |
| Example 2 | 20 | 15 | 1.51 | 10 | 1.49 | 50 | 34.5 | 85.8 |
| Example 3 | 20 | 30 | 1.51 | 15 | 1.49 | 75 | 37.6 | 60.4 |
| Example 4 | 16 | 30 | 1.51 | 8 | 1.49 | 50 | 47.8 | 68.1 |
| Example 5 | 16 | 30 | 1.51 | 10 | 1.49 | 63 | 39.9 | 64 |
| Example 6 | 29 | 30 | 1.51 | 10 | 1.49 | 34 | 61.5 | 69.4 |
| Example 7 | 23 | 30 | 1.51 | 15 | 1.49 | 65 | 35.2 | 63.4 |
| Example 8 | 20 | 30 | 1.51 | 10 | 1.49 | 50 | 61.0 | 79 |
| Example 9 | 20 | 30 | 1.51 | 10 | 1.49 | 50 | 61.0 | 78 |
| Example 10 | 20 | 30 | 1.51 | 10 | 1.49 | 50 | 62.5 | 77 |
| Example 11 | 20 | 30 | 1.51 | 10 | 1.49 | 50 | 62.5 | 77 |
| Example 12 | 20 | 30 | 1.51 | 10 | 1.49 | 50 | 47.4 | 74.5 |
| Comparative Example 1 | 5 | 15 | 1.53 | 3.5 | 1.49 | 70 | 43.9 | 51.8 |
| Comparative Example 2 | 20 | 3 | 1.51 | 10 | 1.49 | 50 | 6.5 | 122.2 |
| Comparative Example 3 | 20 | 70 | 1.51 | 10 | 1.49 | 50 | 65.9 | 51.5 |
| Comparative Example 4 | 20 | 30 | 1.51 | 3 | 1.49 | 15 | 53.1 | 68.5 |

|  | Pencil Hardness | Scratch Resistance | Ra (um) | θa (°) | Reflectance (%) | Adhesion |
|---|---|---|---|---|---|---|
| Example 1 | 4 H | A | 0.107 | 0.77 | 4 | 0/100 |
| Example 2 | 4 H | B | 0.098 | 0.45 | 4 | 0/100 |
| Example 3 | 4 H | A | 0.22 | 0.94 | 4 | 0/100 |
| Example 4 | 4 H | A | 0.101 | 1.02 | 4 | 0/100 |
| Example 5 | 4 H | A | 0.123 | 1.13 | 4 | 0/100 |
| Example 6 | 5 H | A | 0.11 | 0.88 | 4 | 0/100 |
| Example 7 | 5 H | A | 0.165 | 1.06 | 4 | 0/100 |
| Example 8 | 4 H | — | 0.105 | 0.75 | 2.5 | 0/100 |
| Example 9 | 4 H | — | 0.103 | 0.74 | 2.5 | 0/100 |
| Example 10 | 4 H | A | 0.107 | 0.77 | 4 | 0/100 |
| Example 11 | 4 H | A | 0.107 | 0.77 | 4 | 0/100 |
| Example 12 | 4 H | B | 0.152 | 0.91 | 4 | 0/100 |
| Comparative Example 1 | 2 H | C | 0.154 | 1.67 | 4 | 0/100 |
| Comparative Example 2 | 4 H | A | 0.06 | 0.35 | 4 | 0/100 |
| Comparative Example 3 | 4 H | C | 0.157 | 1.88 | 4 | 0/100 |
| Comparative Example 4 | 4 H | C | 0.167 | 1.00 | 4 | 0/100 |

As shown in Table 1, the hard-coated antiglare films of the examples were excellent in all the properties of hardness, scratch resistance, antiglare, and adhesion. On the other hand, the hard-coated antiglare film of Comparative Example 1 had a lower hardness, the hard-coated antiglare film of Comparative Example 2 had poor antiglare properties, the hard-coated antiglare films of Comparative Example 3 and 4 had poor scratch resistance.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:
1. A hard-coated antiglare film, comprising:
a transparent plastic film substrate; and
a hard-coating layer that contains fine particles and formed on at least one surface of the transparent plastic film substrate, wherein the hard-coating layer has a thickness of 15 to 30 μm,
the fine particles have a weight average particle size of 30 to 75% of a thickness of the hard-coating layer,
an average tilt angle θa of the unevenness of the hard-coating layer surface is in the range of 0.4° to 1.5°,
the θa is defined by the mathematical formula (1), $$\text{Average tilt angle } \theta a = \tan^{-1} \Delta a \tag{1};$$

wherein Δa is a value obtained by dividing a sum total of differences (heights h) between the adjacent peaks and a lowest point of a trough formed therebetween by a standard length L of a roughness curve defined in JIS B0601 (1994 version);
the hard-coating layer is formed using a material for forming the hard-coating layer containing Component A, Component B, and Component C,
a ratio of Component B with respect to Component A in the hard-coating layer is in a range of 70% to 180% by weight,
a ratio Component C with respect to Component A in the hard-coating layer is in a range of 25% to 110% by weight, and a ratio of the fine particles with respect to 100 parts by weight of the hard-coating material in the hard-coating layer is in a range of 2 to 70 parts by weight, wherein Component A is at least one of urethane acrylate and urethane methacrylate, Component B is at least one of polyol acrylate and polyol methacrylate, and Component C is a polymer or copolymer that is formed of at least one of Components C1 and C2, or a mixed polymer of the polymer and the copolymer, wherein Component C1 is alkyl acrylate having an alkyl group containing at least one of a hydroxyl group and an acryloyl group, and Component C2 is alkyl methacrylate having an alkyl group containing at least one of a hydroxyl group and an acryloyl group.

2. The hard-coated antiglare film according to claim 1, wherein Component B contains at least one of pentaerythritol triacrylate and pentaerythritol tetraacrylate.

3. The hard-coated antiglare film according to claim 1, further comprising an antireflection layer formed on the hard-coating layer.

4. The hard-coated antiglare film according to claim 3, wherein the antireflection layer contains hollow spherical silicon oxide ultrafine particles.

5. The hard-coated antiglare film according to claim 1, wherein the hard-coated antiglare film has a glossiness of 50 to 95 according to JIS K 7105.

6. A method of manufacturing a hard-coated antiglare film comprising a transparent plastic film substrate and a hard-coating layer formed on at least one surface of the transparent plastic film substrate, comprising:

preparing a material for forming the hard-coating layer containing a resin for forming the hard-coated layer, fine particles, and a solvent;

forming a coating film by applying the material for forming the hard-coating layer onto at least one surface of the transparent plastic film substrate, and forming the hard-coating layer by curing the coating film, wherein the hard-coating layer has a thickness of 15 to 30 µm, the fine particles have a weight average particle size of 30 to 75% of a thickness of the hard-coating layer, an average tilt angle $\theta a$ of the unevenness of the hard-coating layer surface is in the range of 0.4° to 1.5°, the $\theta a$ is defined by the mathematical formula (1), $$\text{Average tilt angle } \theta a = \tan^{-1} \Delta a \qquad (1);$$

wherein $\Delta a$ is a value obtained by dividing a sum total of differences (heights h) between the adjacent peaks and a lowest point of a trough formed there between by a standard length L of a roughness curve defined in JIS B0601 (1994 version); and the resin for forming the hard-coating layer contains Component A, Component B, and Component C, a ratio of Component B with respect to Component A in the hard-coating layer is in a range of 70% to 180% by weight, a ratio Component C with respect to Component A in the hard-coating layer is in a range of 25% to 110% by weight, and a ratio of the fine particles with respect to 100 parts by weight of the hard-coating material in the hard-coating layer is in a range of 2 to 70 parts by weight, wherein Component A is at least one of urethane acrylate and urethane methacrylate, Component B is at least one of polyol acrylate and polyol methacrylate, and Component C is a polymer or copolymer that is formed of at least one of Components C1 and C2, or a mixed polymer of the polymer and the copolymer, wherein Component C1 is alkyl acrylate having an alkyl group containing at least one of a hydroxyl group and an acryloyl group, and Component C2 is alkyl methacrylate having an alkyl group containing at least one of a hydroxyl group and an acryloyl group.

7. The method of manufacturing a hard-coated antiglare film according to claim 6, wherein Component B contains at least one of pentaerythritol triacrylate and pentaerythritol tetraacrylate.

8. The method of manufacturing a hard-coated antiglare film according to claim 6, wherein the solvent contains ethyl acetate.

9. The method of manufacturing a hard-coated antiglare film according to claim 8, wherein a ratio of the ethyl acetate to the entire solvent is at least 20% by weight.

10. An optical device, comprising:
an optical component; and
a hard-coated antiglare film according to claim 1 formed on at least one surface of the optical component.

11. A polarizing plate, comprising a polarizer and the hard-coated antiglare film according to claim 1.

12. An image display, comprising the hard-coated antiglare film according to claim 1.

13. An image display, comprising the optical device according to claim 10.

14. An image display, comprising the polarizing plate according to claim 11.

* * * * *